United States Patent [19]

Rohrmann

[11] Patent Number: 5,539,040

[45] Date of Patent: Jul. 23, 1996

[54] PLASTICS MOLDING COMPOSITION FOR PRODUCTION OF MOLDINGS HAVING A DECORATIVE EFFECT

[75] Inventor: Jürgen Rohrmann, Kelkheim, Germany

[73] Assignee: Hoechst Aktiengesellschaft, Germany

[21] Appl. No.: 274,918

[22] Filed: Jul. 14, 1994

[30] Foreign Application Priority Data

Jul. 17, 1993 [DE] Germany ............... 43 24 030.5

[51] Int. Cl.⁶ .................... C08R 3/26; B32B 3/00
[52] U.S. Cl. ............... 524/425; 524/426; 524/427; 524/452; 524/455; 523/207; 523/222; 523/223; 428/113; 428/171; 428/927
[58] Field of Search ............... 524/425, 426, 524/427, 452, 455; 523/207, 222, 223; 428/113, 171, 927

[56] References Cited

U.S. PATENT DOCUMENTS

| Re. 31,992 | 9/1985 | Ancker et al. | 524/451 |
|---|---|---|---|
| 3,721,637 | 3/1973 | Schultz et al. | 524/452 |
| 3,948,833 | 4/1976 | Kaeir et al. | 524/455 |
| 4,207,373 | 6/1980 | Segal | 524/452 |
| 4,374,059 | 2/1983 | Wagner | 523/153 |
| 4,587,278 | 5/1986 | Dotzauer et al. | 524/452 |
| 4,816,312 | 3/1989 | Annemaier et al. | 428/74 |
| 4,873,116 | 10/1989 | Ancker | 524/451 |

FOREIGN PATENT DOCUMENTS 59-206447  4/1991  Japan.

OTHER PUBLICATIONS

The Condensed Chemical Dictionary. Seventh Edition. Reinhold Publishing Corporation, pages; 228, 259, 260, 692, 958.

Primary Examiner—Paul R. Michl
Assistant Examiner—Alge Asinovsky
Attorney, Agent, or Firm—Connolly & Hutz

[57] ABSTRACT

A polypropylene molding composition which comprises 0.5 to 15% by weight of dark mineral fibers, in particular basalt fibers, can be processed to moldings having a decorative surface. These moldings are used for domestic appliances, for motor vehicles, in the building sector for office items and many other applications.

3 Claims, No Drawings

PLASTICS MOLDING COMPOSITION FOR PRODUCTION OF MOLDINGS HAVING A DECORATIVE EFFECT

DESCRIPTION

The invention relates to a thermoplastic plastics molding composition for production of moldings having a special decorative surface effect. The molding composition can be processed by means of the customary processing methods such as injection molding, extrusion and extrusion blow molding.

Both motor vehicle interior lining components, such as covers of A-, B- and C-columns and the like, and housings for small domestic appliances are currently as a rule produced from thermoplastics by the injection molding process.

The thermoplastic materials are bulk-colored and the finished components are in very many cases provided with a surface structure (graining) for appearance (design) and feel (haptics). This graining is produced during the injection molding process by impression of corresponding engravings incorporated into the surfaces of the cavity of the injection mold. Moldings having a surface nature which is structured but homogeneous in color are the result.

Bulk-colored moldings with surface grainings are an adequate solution in respect of design and quality requirements for many applications. However, there is a demand for moldings which can meet higher requirements in respect of visual properties and comfort, for example for the interiors of medium- and top-range motor vehicles.

To produce higher-quality surfaces on moldings for the interior of motor vehicles the lining components can be either lacquered (for example soft lacquering) or laminated with films or textile materials. Lamination is in each case carried out with the aid of adhesives. Pretreatment of the moldings by flaming, corona discharge or the like is also necessary to achieve a good adhesive strength, depending on the nature of the carrier material. These individual process steps mean a relatively high production cost. Another associated disadvantage lies in the adverse fogging properties.

Fogging is understood as meaning condensation of volatile constituents from the interior fittings of motor vehicles onto panes of glass, in particular the windscreen. The fogging intensity depends of course on several factors and on the prevailing temperature conditions. Since adhesives often contain relatively high contents of volatile substances, components laminated using adhesives practically always represent a significant fogging-promoting potential.

Another disadvantage may occur with components laminated using adhesives in respect of freedom of design. Because of the sometimes only limited deformability of the textiles or films during the laminating operation, restrictions in respect of the geometric structure of the carrier components may have to be taken into account.

It is in principle possible for dyed thermoplastics, which are additionally modified, if appropriate, with reinforcing substances, such as glass fibers or talc and/or elastomers, to be provided with fibers of a different color. It is known that fibers of good heat and mechanical resistance of, for example, thermoplastic polyester, polyamide or polyacrylonitrile can be admixed to polypropylene in an amount of about 0.5 to 3% and mixed homogeneously with the polymer on extruders. Test sheets produced therefrom and provided with a grained surface displayed the desired surface effect reminiscent of textiles. However, attempts to produce moldings of large surface area, in which long flow paths exist for geometric reasons, were unsatisfactory. An inadequate heat and mechanical resistance of the polyester, polyamide or polyacrylonitrile fibers was the reason. The processing temperature of about 230° to 280° C. necessary for injection molding of, for example, polypropylene or polyester and the material shear which occurs in screw injection molding machines during homogenization and during flow through hot channels and thin gates led to severe thermal damage to the fibers. Because of these shearing forces, together with the high temperature, disintegration of the fiber geometry furthermore even occurred in some cases, whereupon the impression of a textile-like surface was lost completely.

Because of the problems in using polyester, polyamide and polyacrylonitrile fibers, the use of carbon fibers was proposed (cf. DE 42 21 208 and EP 499 723). It was found that when carbon fibers are used, no mechanical or thermal problems occur and the desired decorative effect of the molding surface can be achieved. A disadvantage of carbon fiber is its very high price. Its use in cheap standard polymers is therefore unfavorable.

The use of carbon fibers for reinforcement of polymers is known per se. Amounts of 10 to 20% as cut carbon fibers are usually added to polymers in order to achieve an outstanding increase in mechanical properties (flexural strength and the like).

There was therefore the object of developing inexpensive thermoplastic materials which can be processed by the customary plastics shaping processes. In particular, the surfaces of the finished components should have a special decorative surface effect (mottled surfaces, melange effect, textile effect).

It has now been found that the object can be achieved by using dark mineral fibers, in particular basalt fibers.

The invention thus relates to a plastics molding composition for production of moldings having a decorative effect, comprising a) 100 to 50% by weight of a thermoplastic polymer, b) 0 to 50% by weight of reinforcing substances and/or fillers and c) 0.5 to 15% by weight of dark mineral fibers.

The plastics molding composition according to the invention comprises a thermoplastic organic polymer, for example one of those listed below:

1. Polymers of mono- and diolefins, for example polyethylene of high, medium or low density (which may be crosslinked if appropriate) or polypropylene.

2. Mixtures of the polymers mentioned under 1) with one another or with other olefin polymers, for example mixtures of polypropylene with polyethylene, copolymers of mono- and diolefins, such as, for example, ethylene/propylene copolymers, propylene/1-butene copolymers, propylene/isobutylene copolymers, ethylene/1-butene copolymers, propylene/butadiene copolymers, isobutylene/isoprene copolymers and terpolymers of ethylene with propylene and a diene, such as hexadiene, dicyclopentadiene or ethylidenenorbornene.

3. Polystyrene.

4. Copolymers of styrene or α-methylstyrene with dienes or acrylic derivatives, such as, for example, styrene/butadiene, styrene/maleic anhydride, styrene/acrylonitrile, styrene/ethyl methacrylate, styrene/butadiene/ethyl acrylate, styrene/acrylonitrile/methacrylate; mixtures of high impact strength of styrene copolymers and another polymer, such as, for example, a polyacrylate, a diene polymer or an ethylene/propylene/diene terpolymer; and block copolymers of styrene, such as, for example, styrene/butadiene/styrene, styrene/isoprene/styrene, styrene/ethylene-butylene/styrene or styrene/ethylene-propylene/styrene.

5. Graft copolymer of styrene, such as, for example, styrene on polybutadiene, styrene and acrylonitrile on polybutadiene, styrene and maleic anhydride on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 5) which are known, for example, as so-called ABS, MBS, ASA or AES polymers.

6. Polyvinyl chloride.

7. Polyacetals, such as polyoxymethylene, and those polyoxymethylenes which contain comonomers such as, for example, ethylene oxide.

8. Polyphenylene oxides and sulfides and mixtures thereof with styrene polymers.

9. Polyurethanes which are derived from polyethers, polyesters and polybutadienes having terminal hydroxyl groups on the one hand and from aliphatic or aromatic polyisocyanates on the other hand, and precursors thereof (polyisocyanate-polyol prepolymers).

10. Polyamides and copolyamides which are derived from diamines and dicarboxylic acids and/or from aminocarboxylic acids or the corresponding lactams, such as polyamide 4, polyamide 6, polyamide 6.6, polyamide 6.10, polyamide 11, polyamide 12, poly-2,4,4-trimethylhexamethylene terephthalamide, poly-m-phenyleneisophthalamide, and copolymers thereof with polyethers, such as, for example, with polyethylene glycol, polypropylene glycol or polytetramethylene glycol.

11. Polyesters which are derived from dicarboxylic acids and diols and/or from hydroxycarboxylic acids or the corresponding lactones, such as polyethylene terephthalate, polybutylene terephthalate, poly-1,4-dimethylolcyclohexane terephthalate, poly(2,2-bis(4-hydroxyphenyl)propane) terephthalate, polyhydroxybenzoates and block polyether-esters which are derived from polyethylene having hydroxyl end groups, dialcohols and dicarboxylic acids.

A preferred molding composition comprises a) 100 to 50% by weight of isotactic polypropylene or a copolymer of propylene with up to 17% by weight of ethylene, b) 0 to 50% by weight of a rubber-like copolymer compatible with polypropylene, c) 0 to 50% by weight of reinforcing substance and/or filler and d) 0.5 to 15% by weight, based on a)+b)+c), of dark mineral fibers having a fiber length of 0.2 to 20 mm and a thickness of 5 to 30 μm.

A homo- or copolymer of propylene with a melt flow index MFI 230/2 according to DIN 53 735 of 0.2 to 25 g/10 min is preferably used.

Suitable rubber-like copolymers are, above all, amorphous copolymers of 30 to 70% by weight of ethylene and 70 to 30% by weight of propylene, terpolymers of ethylene, propylene and up to 5% by weight of dienes, preferably ethylidenenorbornene or 1,4-hexadiene, copolymers of ethylene and 10 to 45% by weight of vinyl acetate, or block copolymers of styrene and butadiene or styrene and isoprene which have polystyrene blocks on both molecule ends.

Talc, chalk, glass fibers or glass beads are preferably employed as reinforcing fillers.

Dark mineral fibers having a length of 0.2 to 20 mm, preferably 1 to 6 mm, are employed as the decorative material. The thickness of the fiber can be 5 to 30 μm, preferably 10 to 20 μm. The amount added is 0.5 to 15%, preferably 3 to 10%, based on the total molding composition.

Dark olive-colored or dark gray to black basalt fibers are preferably employed since these are commercially obtainable and very inexpensive.

The mineral fibers, in particular the basalt fibers, can be coated with commercially available adhesion promoters (organofunctional silanes, such as, for example, amino-, epoxy-, vinyl-, methacrylic, mercapto- or halosilanes and chromium complex and titanium complex compounds), primers, waxes and with the sizes commercially available for glass fibers for better compatibility with the polymer matrix, to achieve a smoother surface and to achieve a higher reinforcing effect (increase in the FEM and TEM).

The mineral fibers act as a reinforcing substance at the same time, so that when they are used in reinforced polymers, the amount of reinforcing substance can be reduced.

The molding composition according to the invention furthermore can comprise the customary additives which facilitate processing and improve physical properties. Additives which may be mentioned are light and heat stabilizers, antioxidants, antistatics and lubricants, and colored pigments and flameproofing agents. The molding composition in general comprises the first group in an amount of 0.01 to 5% by weight, calculated with respect to the amount of polymer plus filler. Fillers, colored pigments and flameproofing agents are employed in an amount corresponding to requirements.

The processing conditions for the molding composition according to the invention correspond to the conditions which are normally used for processing polypropylene. The processing temperatures—measured immediately after leaving the die—are in the range from 240° to 280° C., depending on the size and complexity of the molding. The mold temperature is in general 40° to 70° C.

For production of moldings of particularly large surface area and difficult process technology, the particularly high processing temperatures for such articles can also be chosen without an impediment to color or properties occurring.

An optimum effect is obtained when polymers having a pale coloration are used, preferably white, gray, blue or brown. This effect can be influenced further by surface treatment of the moldings.

Suitable processing methods are, for example, injection molding, extrusion and the extrusion blow molding process.

The molding composition according to the invention opens up applications, using the customary economically advantageous processing methods for plastics, such as, for example, injection molding, which were previously relatively expensive. Moldings from the molding composition according to the invention are suitable for applications in small domestic appliances, in motor vehicle interiors, in the building sector and in office and communications equipment. From the large number of possible uses, a few examples are listed below:

Domestic:
  toaster housing
  domestic coffee machines, water boilers
  irons containers for freezing and keeping food fresh, bowls and the like cutlery, handles, dishwashing brushes lining components on washing machines, refrigerators and the like garden furniture flowerpot holders Motor vehicles:
door inner linings
column linings, door sills
motorcycle panniers Building sector:
electrical installation programmes (switches, switch and socket panels)
door handles Office:
office furniture moldings (backrests, armrests, chair legs, computer housings, fan housings and the like)
office furniture veneers
attaché case shells The particular advantages of the molding compositions according to the invention are:

the outstanding decorative effect (melange to textile effect similar to carbon fibers)

significant economic advantages compared with carbon fibers problem-free processibility without thermal or mechanical decomposition the additional reinforcing effect ready availability of the fiber material.

The following examples are intended to illustrate the invention (data in % by weight):

EXAMPLE 1

Recipe A: 2.5% of basalt fiber (length up to 5 mm, thickness 13 μm) was added to a mixture of 74% of PP homopolymer powder having an MFI 230/2 of 14 g/10 min, 22% of barium sulfate, 1% of titanium dioxide, 0.1% of bisstearoylethylenediamine, 0.2% of calcium stearate, 0.25% of tris(3,5-di-t-butyl-4-hydroxybenzyl) isocyanurate and 0.25% of tris-2,4-di-t-butylphenyl phosphite, and the mixture was extruded under the conditions customary for reinforced polypropylene.

Injection-molded sheets of this molding composition had a smooth, shiny surface with a clearly pronounced decorative effect (melange effect). On the grained reverse, the structure effect was clearly to be seen, even with severe graining.

Melt flow index MFI 230/2 12.5 g/10 min, tensile E modulus (TEM) 2090 MPa, yield stress 31.7 MPa, breaking stress 26.5 MPa, elongation 6.1%, elongation at break 11.3%.

EXAMPLE 2

Recipe B: 5% of basalt fiber (length up to 5 mm, thickness 13 μm) was added to a mixture of 74% of PP homopolymer powder having an MFI 230/2 of 14 g/10 min, 19% of barium sulfate, 1% of titanium dioxide, 0.1% of bisstearoylethylenediamine, 0.2% of calcium stearate, 0.25% of tris(3,5-di-t-butyl-4-hydroxybenzyl) isocyanurate and 0.25% of tris-2, 4-di-t-butylphenyl phosphite, and the mixture was extruded under the conditions customary for reinforced polypropylene.

Injection-molded sheets of this molding composition had a smooth, shiny surface with a very clearly pronounced decorative effect (melange effect). On the grained reverse, the structure effect was to be seen very clearly, even with severe graining.

Melt flow index MFI 230/2 11.3 g/10 min, TEM 2160 MPa, yield stress 31.4 MPa, breaking stress 26.2 MPa, elongation 5.9%, elongation at break 12.1%.

EXAMPLE 3

Recipe C: 10% of basalt fiber (length up to 5 mm, thickness 13 μm) was added to a mixture of 74% of PP homopolymer powder having an MFI 230/2 of 14 g/10 min, 14% of barium sulfate, 1% of titanium dioxide, 0.1% of bisstearoylethylenediamine, 0.2% of calcium stearate, 0.25% of tris(3,5-di-t-butyl-4-hydroxybenzyl) isocyanurate and 0.25% of tris-2,4-di-t-butylphenyl phosphite, and the mixture was extruded under the conditions customary for reinforced polypropylene.

Injection-molded sheets of this molding composition had a smooth, shiny surface with a very clearly pronounced decorative effect (melange effect). On the grained reverse, the structure effect was to be seen very clearly, even with severe graining.

Melt flow index MFI 230/2 10.8 g/10 min, TEM 2220 MPa, yield stress 31.0 MPa, breaking stress 26.0 MPa, elongation 5.7%, elongation at break 13.4%.

EXAMPLE 4

Recipe D: 5% of basalt fiber (length up to 5 mm, thickness 13 μm) was added to a mixture of 94% of PP homopolymer powder having an MFI 230/2 of 14 g/10 min, 1% of titanium dioxide, 0.1% of bisstearoylethylenediamine, 0.2% of calcium stearate, 0.25% of tris(3,5-di-t-butyl- 4-hydroxybenzyl) isocyanurate and 0.25% of tris-2,4 -di-t-butylphenyl phosphite, and the mixture was extruded under the conditions customary for reinforced polypropylene.

Injection-molded sheets of this molding composition had a smooth, shiny surface with a very clearly pronounced decorative effect (melange effect). On the grained reverse, the structure effect was to be seen very clearly, even with severe graining.

Melt flow index MFI 230/2 11.0 g/10 min, TEM 1970 MPa, yield stress 33.0 MPa, breaking stress 28.0 MPa, elongation 7.2%, elongation at break 16.5%.

EXAMPLE 5

Recipe E: 5% of basalt fiber (length up to 3 mm, thickness 13 μm) was added to a mixture of 94% of PP homopolymer powder having an MFI 230/2 of 14 g/10 min, 1% of titanium dioxide, 0.1% of bisstearoylethylenediamine, 0.2% of calcium stearate, 0.25% of tris(3,5-di-t-butyl- 4-hydroxybenzyl) isocyanurate and 0.25% of tris-2,4 -di-t-butylphenyl phosphite, and the mixture was extruded under the conditions customary for reinforced polypropylene.

Injection-molded sheets of this molding composition had a smooth, shiny surface with a very clearly pronounced decorative effect (melange effect). On the grained reverse, the structure effect was to be seen very clearly, even with severe graining.

Melt flow index MFI 230/2 11.1 g/10 min, TEM 1977 MPa, yield stress 33.2 MPa, breaking stress 27.5 MPa, elongation 7.1%, elongation at break 18.5%.

EXAMPLE 6

Recipe F: 5% of basalt fiber (length up to 5 mm, thickness 13 μm) and 2% of low molecular weight polypropylene modified with polar constituents (®Hostamont TP AR 504) were added to a mixture of 92% of PP homopolymer powder having an MFI 230/2 of 14 g/10 min, 1% of titanium dioxide, 0.1% of bisstearoylethylenediamine, 0.2% of calcium stearate, 0.25% of tris(3,5-di-t-butyl- 4-hydroxybenzyl) isocyanurate and 0.25% of tris-2,4 -di-t-butylphenyl phosphite, and the mixture was extruded under the conditions customary for reinforced polypropylene.

Injection-molded sheets of this molding composition had a smooth, shiny surface with a clearly pronounced decorative effect (melange effect). On the grained reverse, the structure effect was to be seen clearly, even with severe graining.

Melt flow index MFI 230/2 11.5 g/10 min, TEM 2270 MPa, yield stress 36.0 MPa, breaking stress 32.5 MPa, elongation 7.5%, elongation at break 18.5%.

EXAMPLE 7

Recipe G: 54 of basalt fiber (length up to 5 mm, thickness 13 μm sprayed beforehand with a 25% strength aqueous emulsion of the low molecular weight polypropylene modified with polar constituents used in Example 6 and dried so that the total amount contains about 1% of the product) was added to a mixture of 93% of PP homopolymer powder having an MFI 230/2 of 14 g/10 min, 1% of titanium dioxide, 0.1% of bisstearoylethylenediamine, 0.2% of calcium stearate, 0.25% of tris(3,5-di-t-butyl- 4-hydroxybenzyl) isocyanurate and 0.25% of tris-2,4 -di-t-butylphenyl phosphite, and the mixture was extruded under the conditions customary for reinforced polypropylene.

Injection-molded sheets of this molding composition had a smooth, shiny surface with a clearly pronounced decorative effect (melange effect). On the grained reverse, the structure effect was to be seen clearly, even with severe graining.

Melt flow index MFI 230/2 11.5 g/10 min, TEM 2350 MPa, yield stress 37.5 MPa, breaking stress 3.5 MPa, elongation 7.04, elongation at break 16.5%.

EXAMPLE 8

Recipe H: 5% of basalt fiber (length up to 5 mm, thickness 13 μm) and 0.5% of a polypropylene modified with maleic anhydride (®Hostaprime HC 5) was added to a mixture of 93% of PP homopolymer powder having an MFI 230/2 of 14 g/10 min, 1% of titanium dioxide, 0.1% of bisstearoylethylenediamine, 0.2% of calcium stearate, 0.25% of tris(3,5-di-t-butyl-4-hydroxybenzyl) isocyanurate and 0.25% of tris-2,4-di-t-butylphenyl phosphite, and the mixture was extruded under the conditions customary for reinforced polypropylene.

Injection-molded sheets of this molding composition had a smooth, shiny surface with a clearly pronounced decorative effect (melange effect). On the grained reverse, the structure effect was to be seen clearly, even with severe graining.

Melt flow index MFI 230/2 11.5 g/10 min, TEM 2350 MPa, yield stress 36.5 MPa, breaking stress 32.0 MPa, elongation 7.0%, elongation at break 18.0%.

EXAMPLE 9

A toaster housing was produced by injection molding from the molding composition of recipe B (Example 2). The molding was produced on an injection molding machine with a locking force of 5000 kN. All the components of the housing walls were injection molded as a single part in one plane, the side surfaces being ribbed. On the other hand, the front faces of the housing were smooth. The housing was finally produced by folding the molding through in each case 90° around the three film hinges incorporated. The folded housing was fixed by snap-hooks. The film hinges represent significant injection molding obstacles. The operation was therefore carried out at a material temperature of 270° C. In spite of these conditions, no changes in structure or color or troublesome surface defects occurred.

EXAMPLE 10

The molding composition of recipe D (Example 4) was processed analogously to Example 9. No changes in structure or color or troublesome surface defects occurred.

EXAMPLE 11

The molding composition of recipe F (Example 6) was processed analogously to Example 9. No changes in structure or color or troublesome surface defects occurred.

I claim:
1. A plastic molding composition for producing moldings having a decorative effect, which consists of
   a) 100 to 50% by weight of isotactic polypropylene colored in a light basic coloration or a copolymer of propylons colored in a light basic coloration with up to 17% by weight of ethylene,
   b) 0 to 50% by weight of a rubber-like copolymer compatible with polypropylene,
   c) 0 to 50% by weight of reinforcing substance, filler, or reinforcing substance and filler and
   d) 3 to 10% by weight, based on a)+b)+c), of basalt fibers having a fiber length of 1 to 6 mm and a thickness of 10 to 20 μm wherein said basalt fibers have been provided with a coating agent.

2. The molding composition according to claim 1, wherein the reinforcing substances, fillers or reinforcing substances and fillers is present in an amount up to 50% by weight.

3. The composition according to claim 2, wherein said rubber-like copolymer compatible with polypropylene is present in an amount up to 50% by weight.

* * * * *